United States Patent
Zeibig et al.

(10) Patent No.: US 12,247,650 B1
(45) Date of Patent: Mar. 11, 2025

(54) ELECTRIC DRIVE SYSTEM FOR A MOTOR VEHICLE WITH TWO ELECTRIC MOTORS AND A SWITCHABLE TORQUE VECTORING FUNCTION

(71) Applicant: MERCEDES-BENZ GROUP AG, Stuttgart (DE)

(72) Inventors: Jonathan Zeibig, Aalen (DE); Tobias Haerter, Stuttgart (DE); Carsten Gitt, Stuttgart (DE); Tobias Schilder, Ludwigsburg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/718,954

(22) PCT Filed: Nov. 18, 2022

(86) PCT No.: PCT/EP2022/082500
§ 371 (c)(1),
(2) Date: Jun. 12, 2024

(87) PCT Pub. No.: WO2023/110290
PCT Pub. Date: Jun. 22, 2023

(30) Foreign Application Priority Data

Dec. 13, 2021 (DE) ...................... 10 2021 006 118.7

(51) Int. Cl.
*F16H 48/36* (2012.01)
*B60K 1/02* (2006.01)
(Continued)

(52) U.S. Cl.
CPC ............... *F16H 48/36* (2013.01); *B60K 1/02* (2013.01); *B60K 17/02* (2013.01); *B60K 17/165* (2013.01);
(Continued)

(58) Field of Classification Search
CPC ............... F16H 48/36; F16H 2048/364; F16H 2048/368; F16H 2200/201; F16H 2200/2035; B60K 1/02; B60K 17/165
See application file for complete search history.

(56) References Cited

U.S. PATENT DOCUMENTS 7,374,506 B2 * 5/2008 Bucknor ............... B60W 10/08
475/5
7,396,305 B2 * 7/2008 Raghavan ............... B60K 6/547
475/5

(Continued)

FOREIGN PATENT DOCUMENTS

| DE | 102012016508 A1 | 5/2014 |
| DE | 102017109762 A1 | 11/2018 |
| KR | 20190069157 A | 6/2019 |

OTHER PUBLICATIONS

International Search Report and Written Opinion mailed Mar. 20, 2023 in related/corresponding International Application No. PCT/EP2022/082500.

(Continued)

*Primary Examiner* — Derek D Knight
(74) *Attorney, Agent, or Firm* — PATENT PORTFOLIO BUILDERS PLLC (57) ABSTRACT

An electric drive system for a motor vehicle includes a first electric machine with a first rotor, a second electric machine with a second rotor, and a planetary transmission which has a first planetary gear set, a second planetary gear set, a first input shaft, a second input shaft, a first output shaft, and a output input shaft. The first input shaft introduces first torques originating from the first electric machine into the planetary transmission. The second input shaft introduces second torques originating from the second electric machine into the planetary transmission. The first output shaft discharges third torques from the planetary transmission. The (Continued)

second output shaft discharges fourth torques from the planetary transmission.

8 Claims, 2 Drawing Sheets

(51) Int. Cl.
    *B60K 17/02*     (2006.01)
    *B60K 17/16*     (2006.01)
    *F16H 37/08*     (2006.01)
    *F16H 48/10*     (2012.01)

(52) U.S. Cl.
    CPC ......... *F16H 37/0806* (2013.01); *F16H 48/10* (2013.01); *F16H 2048/364* (2013.01); *F16H 2048/368* (2013.01); *F16H 2200/0021* (2013.01); *F16H 2200/201* (2013.01); *F16H 2200/2035* (2013.01)

(56) References Cited

U.S. PATENT DOCUMENTS

| | | | |
|---|---|---|---|
| 8,012,057 | B2 | 9/2011 | Meixner |
| 10,030,755 | B2 * | 7/2018 | Severinsson ............. B60K 6/52 |
| 2015/0065282 | A1 | 3/2015 | Honda et al. |
| 2018/0208048 | A1 | 7/2018 | Morio et al. |
| 2021/0207697 | A1 | 7/2021 | Ahn et al. |

OTHER PUBLICATIONS

Müller; "Die Umlaufgetriebe;" Mar. 5, 1998; Springer Berlin; pp. 44-48 (discussed in the International Search Report and Written Opinion as D4).

Office Action created Aug. 17, 2022 in related/corresponding DE application No. 10 2021 006 118.7.

* cited by examiner

ELECTRIC DRIVE SYSTEM FOR A MOTOR VEHICLE WITH TWO ELECTRIC MOTORS AND A SWITCHABLE TORQUE VECTORING FUNCTION

BACKGROUND AND SUMMARY OF THE INVENTION

Exemplary embodiments of the invention relate to an electric drive system for a motor vehicle with two electric motors and a switchable torque vectoring function.

A drive machine for driving two rotating shafts is taken as known from US 2015/0 065 282 A1.

An electric drive system with one electric motor and a planetary transmission is known from KR 10 2019 069 157 A.

Electric drive machines each with two electric motors and a planetary transmission which enable a torque vectoring function are known from U.S. Pat. No. 8,012,057 B2 as well as the generic US 2021/0 207 697 A1.

Exemplary embodiments of the present invention are directed to an electric drive system for a motor vehicle so that a particularly advantageous drivability and also a high energy efficiency can be achieved.

The invention relates to an electric drive system, also referred to as an electric drive device or formed as an electric drive device, for a motor vehicle, in particular for an automobile. This means that in its completely produced state, the motor vehicle has the electric drive system and can be electrically driven by means of the electric drive system, in particular purely electrically. In particular, in its completely produced state, the motor vehicle has at least or exactly two axes, for example, which are arranged in the vehicle longitudinal direction following one another and thus arranged one behind the other. The respective axle has, for example, at least or exactly two wheels, also referred to as vehicle wheels, wherein preferably the wheels of the respective axle are arranged on sides opposite each other in the vehicle transverse direction. The wheels are ground contact elements by which the motor vehicle may be supported or is supported in the vehicle vertical direction downwards on a ground. For example, the electric drive system is assigned to at least one of the axles or exactly one of the axles so that, for example, the wheels of at least or exactly one of the axles can be driven by means of the electric drive system. The wheels driven by means of the electric drive system are also referred to as drive wheels. If the drive wheels, and thus the motor vehicle, are driven by means of the electric drive system while the motor vehicle is supported downwards in the vehicle vertical direction via the wheels on the ground, the motor vehicle is driven along the ground and the wheels roll on the ground.

The electric drive system has a first electric machine having a first rotor. The first electric machine has a first stator, for example, by means of which the first rotor can be driven and therefore can be rotated around a first machine rotational axis in relation to the stator. Furthermore, the electric drive system has a second electric machine which has a second rotor. For example, the second electric machine has a second stator by means of which the second rotor can be driven and therefore can be rotated around a second machine rotational axis in relation to the second stator. For example, if the electric machines are preferably arranged coaxially to each other, the machine rotational axes coincide. Furthermore, the electric drive system has at least or exactly one planetary transmission, which has a first planetary gear set, a second planetary gear set, a first input shaft, a second input shaft, a first output shaft, and a second output shaft. The first input shaft is formed to introduce first torques originating from the first electric machine, in particular from the first rotor, into the planetary transmission. This can be understood to mean, in particular, that the first electric machine, in particular via its first rotor, can provide the first torques, which can be introduced into the planetary transmission via the first input shaft. This can be used to drive the planetary transmission, in particular. The second input shaft is formed to introduce second torques originating from the second electric machine, in particular from the second rotor, into the planetary transmission. This can be understood to mean, in particular, that the second electric machine, in particular via its second rotor, can provide the second torques, which can be introduced into the planetary transmission via the second input shaft. This can be used to drive the planetary transmission, in particular. Furthermore, it is conceivable that the first torques are introduced into the planetary transmission via the first input shaft bypassing the second input shaft. This can be understood to mean: the first torques which can be or are provided by the first electric machine, in particular by the first rotor, do not run or flow for example along their way from the first electric machine, in particular from the first rotor, into the planetary transmission via the second input shaft, i.e., the first torques bypass the second input shaft, such that the second input shaft, for example, in relation to a first torque transmission path via which the first torques provided by the first electric machine, in particular by the first rotor, can be transmitted from the first electric machine, in particular from the first rotor, to the first input shaft and can be introduced into the planetary transmission via the first input shaft, is not arranged in the first torque transmission path or at least not in the first torque transmission path between the first electric machine and the planetary transmission.

The corresponding applies for the second electric machine and the second torques. The second torques, which can be or are provided by the second electric machine, in particular by the second rotor, do not run or flow along their way from the second electric machine, in particular from the second rotor, into the planetary transmission via the first input shaft, i.e., the second torques bypass the first input shaft, such that the first input shaft for example, in relation to a second torque transmission path via which the second torques provided by the second electric machine, in particular by the second rotor, can be transmitted to the second input shaft and can be introduced into the planetary transmission via the second input shaft, is not arranged in the second torque transmission path or at least not in the second torque transmission path between the second electric machine and the planetary transmission.

The first planetary gear set has a first sum shaft, a first differential shaft, and a second differential shaft. In particular, the first sum shaft, the first differential shaft, and the second differential shaft are first gear elements of the first planetary gear set, for example. The second planetary gear set has a second sum shaft, a third differential shaft, and a fourth differential shaft. In particular, the second sum shaft, the third differential shaft, and the fourth differential shaft are second gear elements of the second planetary gear set, for example. The respective planetary gear set is also referred to as a planetary set.

The sum shaft and differential shafts of a planetary gear set, e.g., of the first planetary gear set, are characterized in that torques of the sum shaft and torques of one of the differential shafts have different signs, wherein torques of the one differential shaft have the same sign as torques of the other differential shaft.

With the electric drive system, the second input shaft is connected in a rotationally fixed manner with the first differential shaft, in particular permanently. The first output shaft is connected in a rotationally fixed manner with the first sum shaft, in particular permanently. Furthermore, it is provided that the second output shaft is connected in a rotationally fixed manner with the second differential shaft, in particular permanently.

In the scope of the present disclosure, the feature that two elements such as, for example, the second input shaft and the first differential shaft are connected with each other in a rotationally fixed manner is understood to mean that the two elements are arranged coaxially to each other and are connected with each other in such a way that they rotate in particular around a common element rotational axis and/or in relation to a housing element of the drive system with the same angular velocity, in particular if the elements or one of the elements and the other element are driven or is driven via the one element. In other words, in the scope of the present disclosure, the term or expression a rotationally fixed connection of two rotatably mounted elements means that the two elements are arranged coaxially to each other and are connected with each other in such a way that rotate with the same angular velocity.

Furthermore, in the scope of the present disclosure, the feature that two elements are connected with each other in a permanently rotationally fixed manner is understood to mean that a switching element, which can be switched between a coupled state, in which the elements are connected with each other in a rotationally fixed manner, and a decoupled state, in which the switching element allows a relative rotation occurring in particular around the aforementioned element rotational axis between the elements, is not assigned to these elements, but rather the elements are always or constantly, i.e., permanently, connected with each other in a rotationally fixed manner. In particular, if the respective first gear element is not connected with a housing device, such as, for example, the aforementioned housing element of the drive system, in a rotationally fixed manner, the respective first gear element can for example be rotated around a first planetary gear set rotational axis of the first planetary gear set in relation to the housing device, which for example is the aforementioned housing element. Accordingly, the respective second gear element can be rotated around a second planetary gear set rotational axis in relation to the housing device, in particular if the respective second gear element is not connected with the housing device in a rotationally fixed manner. In particular, if the planetary gear sets are arranged coaxially to each other, the planetary gear set rotational axes coincide.

In order to be able to achieve a particularly advantageous drivability of the motor vehicle, it is provided in a manner known per se that the planetary transmission has a third planetary gear set, which has a third sum shaft, a fifth differential shaft, and a sixth differential shaft. Therefore, the previous and following embodiments relating to the first planetary gear set and to the second planetary gear set and vice versa can be transferred. Thus, for example, the third sum shaft, the fifth differential shaft, and the sixth differential shaft are third gear elements of the third planetary gear set. Therefore, the following and previous embodiments relating to the first gear elements of the first planetary gear set and to the second gear elements of the second planetary gear set can also be transferred simply to the third gear elements of the third planetary gear set and vice versa, such that, for example, if the respective third gear element is not connected with the housing device in a rotationally fixed manner, the respective third gear element can be rotated around a third planetary gear set rotational axis in relation to the housing device. If the third planetary gear set is arranged coaxially to the first planetary gear set and/or coaxially to the second planetary gear set, the third planetary gear set rotational axis coincides with the first planetary gear set rotational axis and/or with the third planetary gear set rotational axis.

Furthermore, it is provided in a manner known per se that the first input shaft is connected in a rotationally fixed manner with the third sum shaft, in particular permanently. Moreover, it is also provided in a manner known per se that the third differential shaft is connected in a rotationally fixed manner with the fifth differential shaft, in particular permanently. The electric drive system according to the invention enables the motor vehicle to drive in a particularly advantageous and therefore particularly energy-efficient manner.

According to the invention, the first output shaft is connected in a rotationally fixed manner with the fourth differential shaft, in particular permanently.

Furthermore, a first switching element is provided according to the invention, which is formed to connect the fourth differential shaft with the sixth differential shaft in a rotationally fixed manner. This means that the fourth differential shaft can be connected with the sixth differential shaft or can be decoupled from the sixth differential shaft as needed, so that a particularly advantageous drivability is feasible. In particular, the first switching element can be switched between a first coupled state and a first decoupled state. In the first coupled state, the fourth differential shaft is connected with the sixth differential shaft in a rotationally fixed manner by means of the first switching element, such that, for example, the fourth differential shaft and the sixth differential shaft can be rotated together, in particular around the second or third planetary gear rotational axis, in relation to the housing device. In the first decoupled state however, the first switching element allows in particular relative rotations occurring around the second or third planetary gear set rotational axis between the fourth differential shaft and the sixth differential shaft.

In order to be able to achieve a particularly advantageous drivability and a particularly efficient drive of the motor vehicle, furthermore according to the invention a second switching element is provided that is formed to connect the third differential shaft with the sixth differential shaft in a rotationally fixed manner. In particular, the second switching element can be switched between a second coupled state and a second decoupled state. In the second coupled state, the third differential shaft is connected with the sixth differential shaft in a rotationally fixed manner by means of the second switching element, such that, for example, the third differential shaft and the sixth differential shaft can be rotated together or simultaneously, in particular around the second or third planetary gear set rotational axis, in relation to the housing device. In the second decoupled state however, the second switching element allows in particular relative rotations occurring around the second or third planetary gear set rotational axis between the third differential shaft and the sixth differential shaft.

The respective switching element can be a positive locking switching element so that, for example, the respective switching element can be formed as a positive clutch or a claw clutch. Furthermore, it is conceivable that the respective switching element is a frictional switching element so that, for example, the respective switching element is formed as a friction clutch or multi-plate clutch.

Furthermore, it is conceivable that the first switching element, in particular in relation to the housing device, can be moved between at least one first coupled position effecting the first coupled state and at least one first decoupled position effecting the first decoupled state. For example, the first switching element can be moved rotationally between the first coupled position and the first decoupled position. Furthermore, it is conceivable that the second switching element, in particular in relation to the housing device, can be moved between at least one second coupled position effecting the second coupled state and at least one second decoupled position effecting the second decoupled state. For example, the second switching element can be moved rotationally or translationally between the second coupled position and the second decoupled position. Furthermore, the respective switching element can be understood to mean a component, for example, by means of which the fourth differential shaft can be connected with the sixth differential shaft in a rotationally fixed manner, or the third differential shaft can be connected with the sixth differential shaft in a rotationally fixed manner.

By using the third planetary gear set as a further planetary set, which is provided in addition to the first planetary gear set and the second planetary gear set, and in particular by using the switching elements, at least or exactly two states, in particular of the electric drive system, are achieved, i.e. are set. A first of the states is, for example, a so-called torque vectoring state, which is also referred to as a torque distribution state. In the torque vectoring state particularly, advantageous torques can be distributed to the drive wheels by means of the electric machines in order to achieve advantageous drivability. A second of the states is, for example, a so-called single drive state, in which, for example, the drive wheels can be driven or are driven relative to the electric machines by means of only or exactly one of the electric machines, while the drive wheels are not driven by the other electric machine. This means that a particular energy-efficient drive can be achieved.

In order to be able to achieve a particularly good drivability, it is provided in an embodiment of the invention that the second differential shaft is connected with the second sum shaft in a rotationally fixed manner, in particular permanently.

In order to be able to achieve a particularly advantageous drivability in a particularly compact design, it is provided in a further embodiment of the invention that the first differential shaft is formed as a first sun gear, the first sum shaft is formed as a first planetary carrier, which is also referred to as a first link, and the second differential shaft is formed as a first internal gear.

In the scope of the present disclosure, ordinal numerals, also referred to as ordinals, such as for example "first", "second" etc. do not necessarily provide a number or quantity of parts, to which the ordinal numbers refer, but rather, in the scope of the present disclosure, the ordinal numerals are used in order to be able to clearly refer with the aid of the ordinal numerals to terms to which the ordinal numerals refer.

In a further particularly advantageous embodiment of the invention, the third differential shaft is formed as a second sun gear, the fourth differential shaft is formed as a second planetary carrier, which is also referred to as a second link, and the second sum shaft is formed as a second internal gear. Therefore, the installation space requirements can be kept particularly low, while simultaneously achieving a particularly advantageous drivability.

In order to be able to achieve a particularly advantageous drivability in a manner particularly favorable to installation space, it is provided in a further embodiment of the invention that the first planetary carrier is formed as a simple planetary carrier with first planetary gears. This is to be understood, in particular, that the first planetary gears are rotatably mounted on the first planetary carrier, in particular in such a way that the respective first planetary gear can be rotated around a respective, first planetary gear rotational axis in relation to the first planetary carrier. In this case, it is provided, in particular, that the first planetary gear rotational axes run parallel to each other and are spaced apart from each other. In particular, the first planetary gear rotational axes are evenly or equally spaced apart from each other in pairs in of the first planetary gear set, the first circumferential direction, in particular, running around the first planetary gear set rotational axis. In this case, it is preferably provided that the first planetary gears are formed structurally identical to each other and are arranged at the same height, in particular in the axial direction of the first planetary gear set, and in particular start at the same first height and end at the same second height, in particular when viewed in the axial direction of the first planetary gear set.

It has proven to be particularly advantageous if the second planetary carrier is formed as a double planetary carrier with the second planetary gears and third planetary gears. This is to be understood in particular to mean that the second planetary gears and the third planetary gears are rotatably mounted on the second planetary carrier, in particular in such a way that the respective second planetary gear can be rotated around a respective second planetary gear rotational axis in relation to the second planetary carrier, and that the respective third planetary gear can be rotated around a respective third planetary gear rotational axis in relation to the second planetary carrier. In this case, it is conceivable, in particular, that the second planetary gear rotational axes run parallel to each other and are spaced apart from each other, in particular in the second circumferential direction of the second planetary gear set, the second circumferential direction running in particular around the second planetary gear set rotational axis, wherein it is particularly conceivable that the second planetary gear set rotational axes are evenly or equally spaced apart from each other in pairs in the second circumferential direction of the second planetary gear set. Furthermore, it is conceivable that the third planetary gear rotational axes run parallel to each other and are spaced apart from each other, in particular in the second circumferential direction of the second planetary gear set. Preferably, the third planetary gear rotational axes are evenly or equally spaced apart from each other in pairs in the second circumferential direction of the second planetary gear set. For example, the second planetary gears can be structurally identical. Furthermore, it is conceivable that the third planetary gears are structurally identical. For example, the third planetary gear rotational axes run parallel to the second planetary gear rotational axes.

Thus, for example, the second planetary gears are arranged at the same height in the axial direction of the second planetary gear set, i.e., the second planetary gears begin and end at the respective same heights when viewed in the axial direction of the second planetary gear set. Alternatively, or additionally, the third planetary gears, for example, are arranged at the same height in the axial direction of the second planetary gear set such that, preferably, the third planetary gears begin and end at the same heights in the axial direction of the second planetary gear set when viewed in the axial direction of the second planetary gear set. In particular it is conceivable that the second planetary gears are structurally identical, i.e. they are identical with regards to their construction. Alternatively, or additionally, the third planetary gears can be structurally identical, i.e. they are identical with regards to their construction. In this case, it is particularly conceivable that the respective second planetary gear and the respective third planetary gear differ from each other in terms of their construction. Alternatively, or additionally, it is conceivable that the respective second planetary gear and the respective third planetary gear are arranged at the same height or different heights in the axial direction of the second planetary gear set, when viewed in the axial direction of the second planetary gear set, i.e. begin at the same height or at a different height and/or end at the same height or at a different height.

Furthermore, it is preferably provided that the first planetary gears are formed separately from the second planetary gears and separately from the third planetary gears.

For example, the second planetary gears are engaged with the second sun gear, wherein it is conceivable that the respective second planetary gear is engaged with one of the third planetary gears and not with the second internal gear. For example, the third planetary gears are engaged with the second internal gear, wherein it is conceivable that the respective third planetary gear is not engaged with any of the second planetary gears and not with the second sun gear.

In a simple planetary gear set with a simple planetary carrier, i.e., for example if the respective planetary carrier is formed as a simple planetary carrier, the planetary carrier, or a link shaft connected with the planetary carrier in particular permanently in a rotationally fixed manner, is the sum shaft, such that the internal gear and the sun gear are the differential shafts. Kinematically equivalent to this would be a planetary gear set with a double planetary carrier, i.e., if the planetary carrier is formed as a double planetary carrier: Here, however, for example, the internal gear is the sum shaft, while the planetary carrier, i.e., the double planetary carrier, and the sun gear are the differential shafts. Thus, the following applies in particular to each of the planetary gear sets: a simple planetary carrier can be replaced by a double planetary carrier, if, in particular, both link and internal gear connection are replaced and vice versa, in particular in the sense of kinematic equivalence.

A further embodiment is characterized in that the fifth differential shaft is formed as a third sun gear, the third sum shaft is formed as a third planetary carrier and the sixth differential shaft is formed as a third internal gear. Therefore, a particularly advantageous drive can be achieved in a manner particularly favorable to installation space.

In particular, the invention can achieve an active and tailored transmission of torques, such that the overall torque, also referred to as the torque sum, of the two electric machines can be transmitted to a wheel axle or to one of the drive wheels. Therefore, a torque ratio is provided without additional actuators and only by using the two electric machines.

A further embodiment is characterized in that the planetary transmission, the first rotor, and the second rotor are all arranged coaxially to each other, such that, for example, the planetary gear set rotational axes, the first machine rotational axis and the second machine rotational axis all coincide. As a result, a compact construction as well as an advantageous drivability can be achieved.

Lastly, it has proven to be particularly advantageous if the first planetary gear set is formed for a stationary gear ratio of −1.6. In other words, it is preferably provided that the first planetary gear set has a stationary gear ratio of −1.6.

It has further proven to be particularly advantageous if the second planetary gear set is formed for a stationary gear ratio of +2.6, i.e., has a stationary gear ratio of +2.6.

Lastly, it has proven to be particularly advantageous if the third planetary gear set is formed for a stationary gear ratio of −4.2, i.e. has a stationary gear ratio of −4.2. Therefore, a particularly compact construction and a particularly advantageous drivability can be achieved.

Preferably, the planetary transmission is formed as a planetary differential transmission, in particular with a torque vectoring function. The torque vectoring function is also referred to as a torque distribution function. In particular, this can be understood to mean the following: the electric drive system and thus the planetary transmission are assigned to one, in particular to exactly one, of the axles and thus the wheels of the one axle, such that the drive wheels can be driven by means of the electric machine via the planetary transmission. As the planetary transmission is preferably operated or formed as a planetary differential gear, the planetary transmission for example allows different rotational speeds of the drive wheels when the vehicle is cornering, in particular in such a way that the drive wheel on the outside of the bend rotates or can rotate with a greater rotational speed than the drive wheel on the inside of the bend.

Also disclosed is a motor vehicle preferably formed as an automobile, in particular the aforementioned motor vehicle, wherein the motor vehicle has an electric drive system according to the invention. Advantages and advantageous embodiments of the electric drive system are to be considered as advantages and advantageous embodiments of the motor vehicle and vice versa.

In an advantageous embodiment of the invention, the electric drive system can have a first transmission stage which is also referred to as a first final drive. In relation to a first torque flow, along which the third torques can be discharged from the planetary transmission via the first output shaft, the first transmission stage is arranged in the first torque flow, for example, and therefore downstream of the first output shaft, i.e., the first output shaft is connected or positioned downstream. Expressed the other way around, the first output shaft is arranged in the first torque flow and therefore upstream of the first transmission stage.

It has proven to be particularly advantageous in this case if the electric drive system has a second transmission stage, which is referred to as a second final drive. In relation to a second torque flow, along which the fourth torques can be discharged from the planetary transmission via the second output shaft, the second transmission stage is arranged in the second torque flow and therefore downstream of the second output shaft. In other words, the second transmission stage is arranged in the second torque flow and is therefore connected downstream of the second output shaft. Expressed the other way around, the second output shaft is connected downstream. Expressed the other way around, the second output shaft is arranged in the second torque flow and therefore upstream of the second transmission stage. In particular, it is conceivable that a first of the drive wheels can be driven via the first transmission stage from the first output shaft. Furthermore, it is conceivable that the second drive wheel can be driven via the second transmission stage from the second output shaft.

It has proven to be particularly advantageous in this case if the first transmission stage, the second transmission stage, the planetary gear sets, and the rotors are arranged in a common housing of the electric drive system. In particular, the housing may be the aforementioned housing element and/or the aforementioned housing device. The respective transmission stage has at least or exactly two respective gear wheels, for example, which may be formed in particular as spur gears. For example, the respective gear wheels of the respective transmission stage are engaged, in particular directly, with each other, such that the respective gear wheels of the respective transmission stage form a respective spur gear stage or spur gear pairing, for example. By using the transmission stages, a particularly advantageous and, in particular, a particularly advantageously large transmission ratio and thus particularly advantageous drivability can be achieved in a manner particularly favorable to installation space.

In order to keep the installation space required for the electric drive system to a particularly low level, it is provided in a further embodiment of the invention that the planetary transmission, the two rotors, and the two transmission stages are arranged coaxially to each other. Preferably, it is provided that the planetary gear sets are arranged coaxially to each other so that the planetary gear set rotational axes coincide. A coaxial arrangement of the rotors, i.e., that the rotors are preferably arranged coaxially to one another, can be understood to mean, in particular, that the machine rotational axes coincide. If, for example, the rotors are arranged coaxially to each other and coaxially to the planetary gear sets and thus coaxially to the planetary transmission, the machine rotational axes coincide, the planetary gear set rotational axes coincide and the respective planetary gear set rotational axis coincides with the respective machine rotational axis. Furthermore, it is conceivable, for example, that the respective transmission stage has at least one transmission element which, for example, can be formed as a gear wheel, in particular as a spur gear. The respective transmission element of the respective transmission stage can be rotated, in particular around a transmission element rotational axis, in relation to the housing. If the transmission stages are arranged coaxially to each other, the transmission elements of the transmission stages are arranged coaxially to each other, such that the transmission element rotational axes coincide. If, for example, the transmission stages are now arranged coaxially to each other, coaxially to the planetary transmission, and coaxially to the rotors, the planetary gear set rotational axes, the machine rotational axes and the transmission element rotational axes all coincide, whereby a particularly space-saving construction can be achieved.

In order to be able to keep the number of parts and thus the weight, the costs and the installation space requirements particularly low and to realize advantageous drivability, it is provided in a further embodiment of the invention that the respective transmission stage is formed as a respective further planetary gear set. Thus, it is conceivable that the first transmission stage is formed as a fourth planetary gear set and the second transmission stage is formed as a fifth planetary gear set, wherein the fourth planetary gear set is provided in addition to the first, second, third, and fifth planetary gear set. Thus, for example, the respective aforementioned transmission element of the respective transmission stage is a respective sun gear or a respective internal gear or a respective planetary carrier of the respective, fourth or fifth planetary gear set. Furthermore, it is preferably provided that a respective input of the respective, further planetary gear set, i.e., the respective transmission stage, is a respective further sun gear of the respective further planetary ger set. Thus, for example, the third torques discharged via the first output shaft from the planetary transmission and in particular provided by the first output shaft can be introduced into the first transmission stage via the input, i.e., via the sun gear, of the first transmission stage formed as the fourth planetary gear set. Furthermore, for example, the fourth torques discharged via the second output shaft from the planetary transmission and in particular provided by the second output shaft can be introduced into the second transmission stage via the input, i.e., via the sun gear, of the second transmission stage formed as the fifth planetary gear set. It has also proved to be advantageous if the respective further planetary carrier of the respective further planetary gear set, i.e., the respective transmission stage, is a respective output or output drive of the respective transmission stage. Thus, for example, the first transmission stage formed as the fourth planetary gear set, can provide fifth torques via its further planetary carrier, i.e., can direct or dissipate fifth torques from itself, wherein the fifth torques result from the third torques, for example, which are or were introduced into the first transmission stage, in particular via the further sun gear of the first transmission stage. Furthermore, for example, the second transmission stage formed as the fifth planetary gear set can provide sixth torques via its further planetary carrier, i.e., can direct or dissipate sixth torques from itself, wherein the sixth torques result from the fourth torques for example, which are or were introduced into the second transmission stage, in particular via the further sun gear of the second transmission stage. It has also proved to be particularly advantageous if the respective, further internal gear of the respective transmission stage formed as the fourth or fifth planetary gear set is fixed to the housing, i.e., connected to the housing in a rotationally fixed manner, in particular permanently, wherein the housing is, for example, the housing element and/or the housing device.

Further advantages, features and characteristics of the invention result from the following description of a preferred exemplary embodiment and from the drawings.

BRIEF DESCRIPTION OF THE DRAWING FIGURES

In the drawing.

In the figures identical or functionally identical elements are provided with the same reference sign.

DETAILED DESCRIPTION

Figure 1:
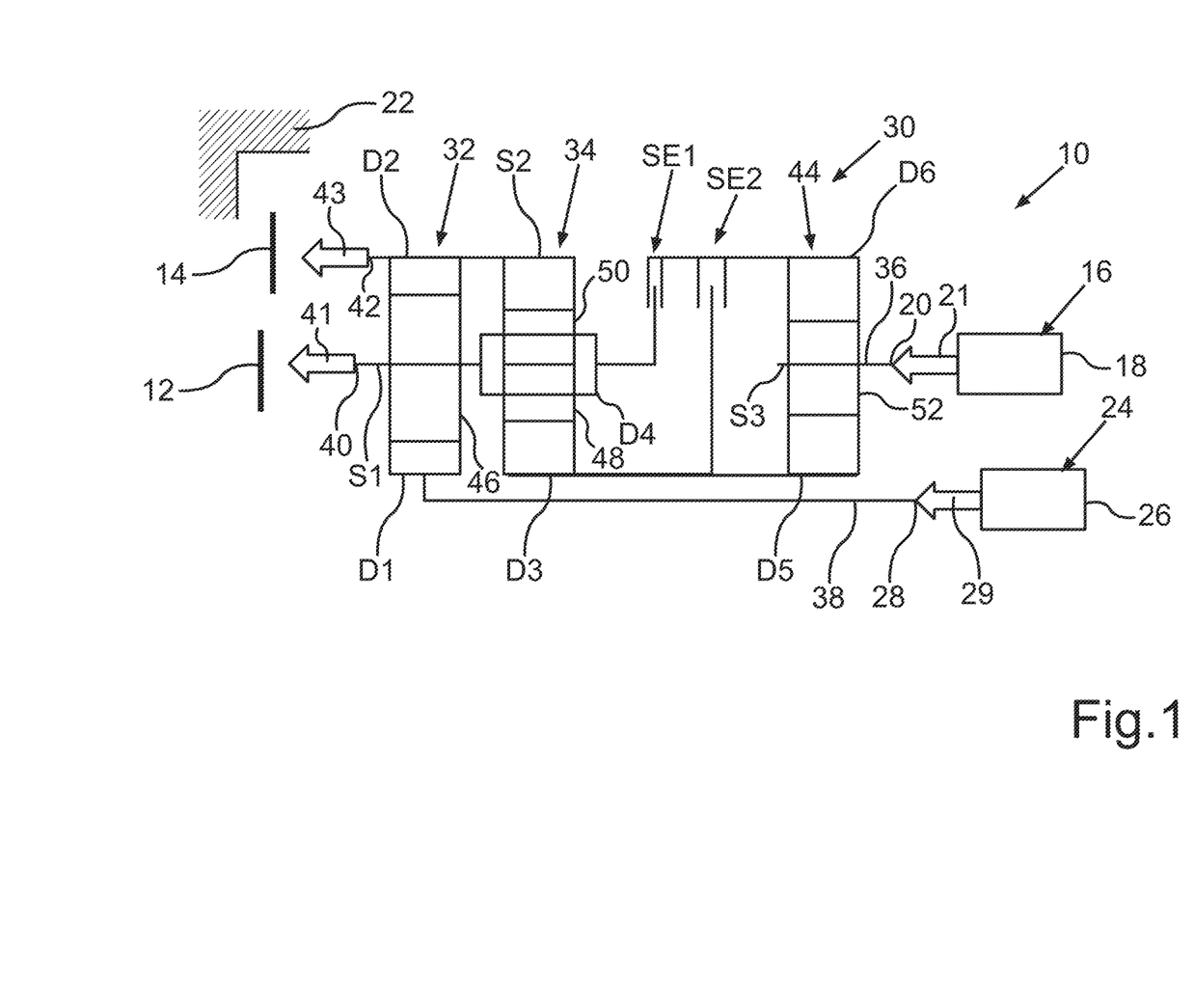
FIG. 1 shows a schematic representation of an electric drive system in a first state.

FIG. 1 shows an electric drive system 10 for a motor vehicle, in particular for an automobile, in a schematic representation. Thus, the motor vehicle, in its completely produced state, has the electric drive system 10, by means of which the motor vehicle can be driven electrically, in particular purely electrically. The motor vehicle has at least or exactly two axles arranged in the vehicle longitudinal direction following each other and thus arranged one behind the other. The respective axle has at least or exactly two wheels, also referred to as vehicle wheels, wherein the respective wheels of the respective axle are arranged on sides of the motor vehicle that are opposite each other in the vehicle transverse direction. For example, the drive system 10 is assigned to at least one of the axles or to exactly one of the axles so that at least or only the wheels of the axle, to which the electric drive system 10 is assigned, can be driven by means of the electric drive system 10. The wheels driven by means of the electric drive system 10 are also referred to as drive wheels. The drive wheels are represented in FIG. 1 particularly schematically and referred to with 12 and 14. The motor vehicle can be driven electrically, in particular purely electrically, by in particular purely electrical driving of the drive wheels 12 and 14 by means of the drive system 10.

The drive system 10 has a first electric machine 16, which has a first stator 18 and a first rotor 20. The rotor 20 can be driven by means of the stator 18 and therefore rotated around a first machine rotational axis in relation to the stator 18. The drive system 10 has a housing 22, represented particularly schematically in FIG. 1, which is also referred to as a housing device or housing element. In this case, the rotor 20 can be rotated around the first machine rotational axis in relation to the stator 18 and in relation to the housing 22.

The drive system 10 further comprises a second electric machine 24, which has a second stator 26 and a second rotor 28. The rotor 28 can be driven by means of the stator 26 and as a result rotated around a second machine rotational axis in relation to the stator 26 and in relation to the housing 22. Preferably, the electric machines 16 and 24 and thus their rotors 20 and 28 are arranged coaxially to each other, even though this is represented differently in FIG. 1 for reasons of space. As the electric machines 16 and 24 and thus their rotors 20 and 28 are preferably arranged coaxially to each other, the machine rotational axes coincide. The electric machine 16 can provide first torques via its rotor 20, which are illustrated by an arrow 21. The second electric machine 24 can provide second torques via its rotor 28, which are illustrated by an arrow 29 in FIG. 1.

The drive system 10 has a planetary transmission 30, which has a first planetary gear set 32 and a second planetary gear set 34. The planetary gear sets 32 and 34 are also simply referred to as planetary sets. Furthermore, the planetary transmission 30 has a first input shaft 36 and a second input shaft 38. Furthermore, the planetary transmission 30 has a first output shaft 40 and a second output shaft 42. The first input shaft 36 is formed to introduce the first torques, originating from the electric machine 16, i.e., from the first electric machine 16 via the rotor 20 and thus provided by the rotor 20, into the planetary transmission 30. The second input shaft 38 is formed to introduce the second torques, originating from the second electric machine 24, i.e., from the electric machine 24 via the rotor 28 and thus provided by the rotor 28, into the planetary transmission 30. The first output shaft 40 is formed to discharge third torques, which, for example, result from the first torques and/or second torques introduced into the planetary transmission 30, from the planetary transmission 30, wherein the third torques are represented in FIG. 1 by an arrow 41. The second output shaft 42 is formed to discharge fourth torques, which, for example, result from the first torques and/or second torques introduced into the planetary transmission 30, from the planetary transmission 30, wherein the fourth torques are represented in FIG. 1 by an arrow 43.

The first planetary gear set 32 has a first sum shaft S1, a first differential shaft D1, and a second differential shaft D2. The second planetary gear set 34 has a second sum shaft S2, a third differential shaft D3, and a fourth differential shaft D4. In this case, the second input shaft 38 is connected in a rotationally fixed manner with the first differential shaft D1, in particular permanently. The first output shaft 40 is connected in a rotationally fixed manner with the first sum shaft S1, in particular permanently. Furthermore, the first output shaft 40 is connected in a rotationally fixed manner with the fourth differential shaft D4, in particular permanently. The second output shaft 42 is connected in a rotationally fixed manner with the second differential shaft D2, in particular permanently. Furthermore, it is provided in the exemplary embodiment shown in FIG. 1 that the second output shaft 42 is connected in a rotationally fixed manner with the second sum shaft S2, in particular permanently, such that in the exemplary embodiment shown in FIG. 1, the second differential shaft D2 is connected in a rotationally fixed manner with the second sum shaft S2, in particular permanently.

In order to be able to achieve a particularly advantageous drivability of the motor vehicle in a manner particularly favorable to installation space, the planetary transmission 30 has a third planetary gear set 44, which is also referred to as a third planetary set. The third planetary gear set 44 has a third sum shaft S3, a fifth differential shaft D5, and a sixth differential shaft D6. In this case, the first input shaft 36 is connected in a rotationally fixed manner with the third sum shaft S3, in particular permanently. Furthermore, the third differential shaft D3 is connected in a rotationally fixed manner with the fifth differential shaft D5, in particular permanently. In the exemplary embodiment shown in FIG. 1, the input shaft 36 is connected in a rotationally fixed manner with the rotor 20, in particular permanently. Furthermore, in the exemplary embodiment shown in FIG. 1, it is provided that the input shaft 38 is connected in a rotationally fixed manner with the rotor 28, in particular permanently.

The electric drive system 10, in particular the planetary transmission 30, has a first switching element SE1 which is formed to connect the fourth differential shaft D4 with the sixth differential shaft D6 in a rotationally fixed manner. Furthermore, the electric drive system 10, in particular the planetary transmission 30, has a second switching element SE2, which is formed to connect the third differential shaft D3, and thus in the exemplary embodiment shown in FIG. 1, the fifth differential shaft D5, with the sixth differential shaft D6 in a rotationally fixed manner.

FIG. 1 shows a first state of the electric drive system 10, in particular of the planetary transmission 30, wherein the first state for example is a first switching state. In the first state, the switching element SE1 is closed, while the switching element SE2 is open, such that in the first state the fourth differential shaft D4 is connected in a rotationally fixed manner with the sixth differential shaft D6 by means of the first switching element SE1, while the third differential shaft D3 is not connected in a rotationally fixed manner with the sixth differential shaft D6, such that, for example, the third differential shaft D3 and the sixth differential shaft D6 can rotate in relation to each other, in particular around a first planetary gear set rotational axis of the planetary gear set 32 and/or around a second planetary gear set rotational axis of the second planetary gear set 34 and/or around a third planetary gear set rotational axis of the third planetary gear set 44. In the exemplary embodiment shown in FIG. 1, the planetary gear sets 32, 34 and 44 are arranged coaxially to each other, such that the aforementioned planetary gear set rotational axes coincide. Furthermore, it is conceivable that the planetary gear sets 32, 34, and 44 and thus the planetary transmission 30 are arranged coaxially to the rotors 20 and 28, such that the planetary gear set rotational axes coincide and such that the planetary gear set rotational axes coincide with the machine rotational axes, which similarly coincide.

Figure 2:
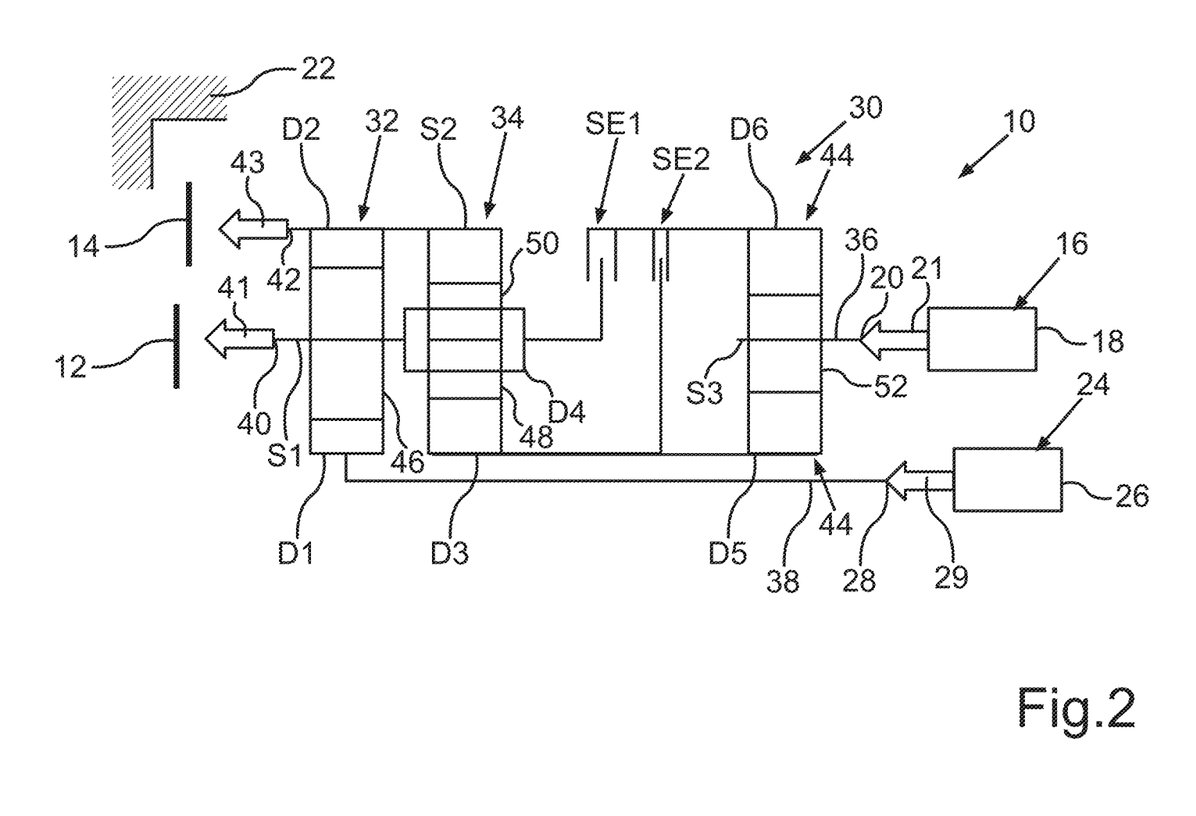
FIG. 2 shows a schematic representation of the electric drive system in a second state.

FIG. 2 shows a second state of the electric drive system 10, in particular of the planetary transmission 30. The second state is also referred to as a second switching state. In the second state, the switching element SE1 is opened, while the second switching element SE2 is closed. Thus, in the second state the third differential shaft D3 and the sixth differential shaft D6 are connected with each other by means of the second switching element SE2 in a rotationally fixed manner, while the fourth differential shaft D4 and the sixth differential shaft D6 are not connected with each other in a rotationally fixed manner but can rotate in relation to each other around the respective planetary gear rotational axis.

In the exemplary embodiment shown in the figures, the first differential shaft D1 is formed as a first sun gear of the first planetary gear set 32. The first sum shaft S1 is formed as a first planetary carrier of the first planetary gear set 32, wherein the first planetary carrier is also referred to as a first link. Furthermore, the second differential shaft D2 is formed as a first internal gear of the first planetary gear set 32. Furthermore, it is provided in the exemplary embodiment shown in the figures that the third differential shaft D3 is formed as a second sun gear of the second planetary gear set 34. The fourth differential shaft D4 is formed as a second planetary carrier of the second planetary gear set 34, wherein the second planetary carrier is also referred to as a second link. The second sum shaft S2 is formed as a second internal gear of the second planetary gear set 34.

In the exemplary embodiment shown in the figures, the first planetary carrier is formed as a simple planetary carrier with first planetary gears 46. The respective, first planetary gear 46 is rotatably mounted on the first planetary carrier, wherein the respective first planetary gear 46 meshes, in particular simultaneously, with the first sun gear and with the first internal gear.

The second planetary carrier is formed as a double planetary carrier with second planetary gears 48 and third planetary gears 50, wherein preferably the second planetary gears 48 and the third planetary gears 50 are rotatably mounted on the second planetary carrier, i.e., on the double planetary carrier. Therefore, it is conceivable that, for example, the second planetary gears 48 are engaged with the second sun gear, however they are not engaged with the second internal gear and also not with the third planetary gears 50, wherein it is conceivable that the third planetary gears 50 are engaged with the second internal gear, however not with the second sun gear and not with the second planetary gears 48. Thus, for example, the second sun gear meshes with the second planetary gears 48, and the third planetary gears 50 mesh with the second internal gear, whereby, for example, the planetary gears 48 and 50 mesh with each other or the planetary gears 48 and 50 do not mesh with each other. Furthermore, the second planetary gears 48 do not mesh with second internal gear, and the third planetary gears 50 do not mesh with the second sun gear. Furthermore, the first planetary gears 46 are formed separately from the second planetary gears 48 and separately from the third planetary gears 50.

In the exemplary embodiment shown in the figures, the fifth differential shaft D5 is formed as a third sun gear of the third planetary gear set 44. Furthermore, the third sum shaft S3 is formed as a third planetary carrier of the third planetary gear set 44, and the sixth differential shaft D6 is formed as a third internal gear of the third planetary gear set 44. In this case, preferably the third planetary carrier is formed as a simple planetary carrier with the fourth planetary gears 52, which are rotatably mounted on the third planetary carrier. In this case, it is preferably provided that the respective third planetary gear 52, in particular simultaneously, meshes with the third internal gear and with the third sun gear of the planetary gear set 44, i.e., is engaged therewith.

The respective output shaft 40 or 42 is also referred to as an output drive shaft. In this case, the respective drive wheel 12 or 14 can be driven by the respective output drive shaft, i.e., by the output shaft 40 or 42.

Preferably, the electric drive system 10 has a first transmission stage, not shown in the figures, which is arranged in the first torque flow and downstream of the first output shaft 40 in relation to a first torque flow along which the third torques can be discharged out of the planetary transmission 30 via the first output shaft 40. A first side shaft (not shown in the figures) is arranged in the first torque flow for example, which side shaft is arranged in the first torque flow and in the process downstream of the first transmission stage. The first side shaft can be driven by the first output shaft 40 via the first transmission stage, wherein the drive wheel 12 can be driven by the first side shaft and thus by the first transmission stage via the first side shaft. The drive system 10 can further comprise a second transmission stage, not shown in the figures, which is arranged in the second torques flow and in the process downstream of the second output shaft 42 with respect to a second torques flow along which the fourth torques can be discharged from the planetary transmission 30 via the second output shaft 42. In the second torques flow downstream of the second transmission stage, a second side shaft, not shown in the figures, is arranged, wherein the drive wheel 14 can be driven by the second transmission stage via the second side shaft. Furthermore, the second side shaft can be driven by the second output shaft 42 via the second transmission stage. As a result, the first side shaft can be driven by the output shaft 40 via the first transmission stage. The respective transmission stage is also referred to as the final drive (FD). Preferably, the first transmission stage is a fourth planetary gear set, wherein it is conceivable that the second transmission stage is a fifth planetary gear set. Preferably, the fourth planetary gear set and the fifth planetary gear set are of the same design, i.e., identical or the same in terms of their construction and thus in particular in terms of their transmission ratio.

It has also proved to be particularly advantageous if the transmission stages, the planetary gear sets 32, 34 and 44 and the rotors 20 and 28 are arranged coaxially to each other. Furthermore, it is preferably provided that the transmission stages are arranged in the housing 22. It is thus very preferably provided that the planetary gear sets 32, 34 and 44 as well as the rotors 20 and 28 and also the transmission stages are arranged in the common housing 22.

In the, or through the, first state, a pure differential operation can be achieved for example, whereby the switching element SE1 is closed and the switching element SE2 is open. The first electric machine 16 feeds the respective first torque via the third planetary gear set 44 and ultimately via the second sun gear and the second planetary carrier, in particular the planetary transmission 30, whereby here, for example, the electric machine 24 rotates idly, so to speak. The first planetary gear set 32 is also uninvolved here, so to speak, since the first sun gear in particular rotates idly. Via the first output drive shaft, i.e., via the first output shaft 40 and thus via the first planetary carrier, the respective third torque, in particular as half of the first torque generated or provided by the electric machine 16, is transmitted to one of the drive wheels 12 and 14, in particular to the drive wheel 12, and via the second output drive shaft, thus via the second output shaft 42 and thus via the first internal gear, the fourth torque, in particular as the other half of the first torque provided by the electric machine 16 and in particular introduced into the planetary transmission 30, is transmitted to the other of the drive wheels 12 and 14, in particular to the drive wheel 14.

In, or through, the second state, shown in FIG. 2, so-called active torque vectoring, i.e., an active torque distribution function, can be achieved, wherein the switching element SE1 is open and the switching element SE2 is closed. As a result, the third planetary gear set 44 is locked, as the third internal gear is connected to the third sun gear by means of the switching element SE2 in a rotationally fixed manner. As a result, the electric machine 16 feeds its entire, respective first torque to the second sun gear or via the second sun gear, in particular into the planetary transmission 30. The electric machine 24 feeds its respective second torque to the first sun gear or via the first sun gear, in particular into the planetary transmission 30. It is therefore the case that the third planetary gear set 44 serves to ensure that, originating from a simple transmission and in particular the planetary transmission 30, only two switching elements, namely the switching elements SE1 and SE2, are required in order to be able to realize not only the second state, i.e., not only active torque vectoring, but also the first state and thus pure differential operation, wherein pure differential operation is also referred to as single-EM driving operation, during which or in which a half split, i.e., a 50:50 split, of the torque fed into the planetary transmission 30, in particular the first torque, can be achieved or is achieved. In principle, the same effect could also be achieved without the third planetary gear set 44, but four or five switching elements would then be required to achieve a high number of shaft switching operations in order to realize single-EM driving operation. This therefore means that the electric drive system 10 can save components and thus weight, costs, and installation space, while at the same time providing particularly advantageous drivability.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE SIGN LIST

10 Electric drive system
12 Drive wheel
14 Drive wheel
16 First electric machine
18 First stator
20 First rotor
21 Arrow
22 Housing
24 Second electric machine
26 Second stator
28 Second rotor
29 Arrow
30 Planetary transmission
32 First planetary gear set
34 Second planetary gear set
36 First input shaft
38 Second input shaft
40 First output shaft
41 Arrow
42 Second output shaft
43 Arrow
44 Third planetary gear set
46 First planetary gear
48 Second planetary gear
50 Third planetary gear
52 Fourth planetary gear
D1 First differential shaft
D2 Second differential shaft
D3 Third differential shaft
D4 Fourth differential shaft
D5 Fifth differential shaft
D6 Sixth differential shaft
S1 First sum shaft
S2 Second sum shaft
S3 Third sum shaft
SE1 First switching element
SE2 Second switching element

The invention claimed is:

1. An electric drive system for a motor vehicle, the electric drive system comprising:
a first electric machine with a first rotor;
a second electric machine with a second rotor; and
a planetary transmission with a first planetary gear set, a second planetary gear set, a first input shaft, a second input shaft, a first output shaft, and a second output shaft,
wherein the first input shaft is configured to introduce first torques originating from the first electric machine into the planetary transmission,
wherein the second input shaft is configured to introduce second torques originating from the second electric machine into the planetary transmission,
wherein the first output shaft is configured to discharge third torques from the planetary transmission,
wherein the second output shaft is configured to discharge fourth torques from the planetary transmission,
wherein the first planetary gear set has a first sum shaft, a first differential shaft, and a second differential shaft,
wherein the second planetary gear set has a second sum shaft, a third differential shaft, and a fourth differential shaft,
wherein the second input shaft is connected in a rotationally fixed manner with the first differential shaft,
wherein the first output shaft is connected in a rotationally fixed manner with the first sum shaft,
wherein the second output shaft is connected in a rotationally fixed manner with the second differential shaft,
wherein the planetary transmission has a third planetary gear set having a third sum shaft, a fifth differential shaft, and a sixth differential shaft,
wherein the first input shaft is connected in a rotationally fixed manner with the third sum shaft,
wherein the third differential shaft is connected in a rotationally fixed manner with the fifth differential shaft, wherein the first output shaft is connected in a rotationally fixed manner with the fourth differential shaft, wherein a first switching element is configured to connect the fourth differential shaft in a rotationally fixed manner with the sixth differential shaft, and wherein a second switching element is configured to connect the third differential shaft in a rotationally fixed manner with the sixth differential shaft.

2. The electric drive system of claim 1, wherein the second differential shaft is connected in a rotationally fixed manner with the second sum shaft.

3. The electric drive system of claim 1, wherein
the first differential shaft is configured as a first sun gear,
the first sum shaft is configured as a first planetary carrier, and
the second differential shaft configured as a first internal gear.

4. The electric drive system of claim 3, wherein
the third differential shaft is configured as a second sun gear,
the fourth differential shaft is configured as a second planetary carrier, and
the second sum shaft is configured as a second internal gear.

5. The electric drive system of claim 4, wherein
the first planetary carrier is configured as a simple planetary carrier with first planetary gears,
the second planetary carrier is configured as a double planetary carrier with second planetary gears and third planetary gears, and
the first planetary gears are configured separately from the second planetary gears and separately from the third planetary gears.

6. The electric drive system of claim 5, wherein
the fifth differential shaft is configured as a third sun gear,
the third sum shaft is configured as a third planetary carrier, and
the sixth differential shaft is configured as a third internal gear.

7. The electric drive system of claim 1, wherein the planetary transmission, the first rotor, and the second rotor are arranged coaxially to each other.

8. The electric drive system of claim 1, wherein
the first planetary gear set is configured for a stationary gear ratio of $-1.6$,
the second planetary gear set is configured for a stationary gear ratio of $+2.6$, and
the third planetary gear set is configured for a stationary gear ratio of $-4.2$.

* * * * *